(12) United States Patent
Sigg et al.

(10) Patent No.: US 8,456,989 B1
(45) Date of Patent: Jun. 4, 2013

(54) METHOD AND SYSTEM FOR USING SUPPLEMENTAL CHANNELS FOR A COMMUNICATION SESSION

(75) Inventors: Jason P. Sigg, Overland Park, KS (US); Jasinder P. Singh, Olathe, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 390 days.

(21) Appl. No.: 12/827,683

(22) Filed: Jun. 30, 2010

(51) Int. Cl.
*G01R 31/08* (2006.01)
*H04W 4/00* (2009.01)

(52) U.S. Cl.
USPC .......................................... 370/230; 370/333

(58) Field of Classification Search
None
See application file for complete search history.

(56) References Cited

U.S. PATENT DOCUMENTS

| | | | |
|---|---|---|---|
| 6,373,831 B1 | 4/2002 | Secord et al. | |
| 6,802,035 B2 | 10/2004 | Catreux et al. | |
| 7,050,407 B1 | 5/2006 | Frazer et al. | |
| 7,362,735 B2 | 4/2008 | Mantha | |
| 7,889,707 B2 | 2/2011 | Niu et al. | |
| 8,130,695 B2 | 3/2012 | Pi et al. | |
| 2001/0022000 A1* | 9/2001 | Horn et al. | 725/95 |
| 2002/0075827 A1* | 6/2002 | Balogh et al. | 370/331 |
| 2002/0086692 A1* | 7/2002 | Chheda et al. | 455/522 |
| 2003/0103470 A1* | 6/2003 | Yafuso | 370/282 |
| 2003/0143995 A1 | 7/2003 | Friedman et al. | |
| 2005/0220058 A1* | 10/2005 | Garg | 370/335 |
| 2005/0250521 A1* | 11/2005 | Joshi et al. | 455/466 |
| 2007/0135125 A1* | 6/2007 | Kim et al. | 455/436 |
| 2008/0037521 A1 | 2/2008 | Gutierrez et al. | |
| 2008/0212527 A1* | 9/2008 | Hosein et al. | 370/329 |
| 2008/0219228 A1 | 9/2008 | Seok et al. | |
| 2009/0005049 A1* | 1/2009 | Nishio et al. | 455/442 |
| 2009/0156227 A1 | 6/2009 | Frerking et al. | |
| 2010/0027482 A1 | 2/2010 | Murakami et al. | |
| 2010/0113004 A1* | 5/2010 | Cave et al. | 455/422.1 |
| 2010/0172279 A1* | 7/2010 | Chen et al. | 370/312 |
| 2010/0202317 A1 | 8/2010 | Proctor, Jr. | |
| 2010/0222059 A1* | 9/2010 | Pani et al. | 455/436 |
| 2011/0141901 A1 | 6/2011 | Luo et al. | |
| 2012/0106490 A1 | 5/2012 | Nakashima et al. | |

FOREIGN PATENT DOCUMENTS

WO 2010/007367 A1 1/2010

OTHER PUBLICATIONS

3rd Generation Partnership Project 2, "Physical Layer Standard for cdma2000 Spread Spectrum Systems, Revision E," 3GPP2 C.S0002-E, Version 1.0, Sep. 2009.
U.S. Appl. No. 12/827,604, filed Jun. 30, 2010.

* cited by examiner

*Primary Examiner* — Eunsook Choi

(57) ABSTRACT

During an initial part of a communication session, a transmitting node transmits digital data over a first air interface channel to a receiving node, using a first data rate and a first level of repetition. A degradation in quality of the communication session is detected. During a subsequent part of the communication session, the transmitting node transmits digital data over the first air interface channel as before but also transmits the digital data over a second air interface channel, using a second data rate and a second level of repetition. The second data rate is higher than the first data rate, and the second level of repetition is higher than the first level of repetition. Thus, during a given transmission period, the transmitting node may transmit a voice frame once over the first air interface channel and N times over the second air interface channel.

16 Claims, 4 Drawing Sheets

METHOD AND SYSTEM FOR USING SUPPLEMENTAL CHANNELS FOR A COMMUNICATION SESSION

BACKGROUND

Cellular wireless communication networks were originally designed to support voice communications. For example, the TIA/EIA-95 family of standards describe a code division multiple access (CDMA) air interface in which different codes define traffic channels that share a 1.25 MHz frequency channel. Each traffic channel can be used to transmit a digitally encoded voice signal, for example, at a data rate of 9600 bits per second (bps).

Cellular wireless communication networks have evolved to support higher data rates for communications over the forward link (from a base station to a mobile station) and the reverse link (from a mobile station to a base station). In the 1xRTT approach of cdma2000, different codes define fundamental channels and supplemental channels that share a 1.25 MHz frequency channel. A forward or reverse fundamental channel may be configured to support a data rate of up to 14.4 kpbs. A supplemental channel, however, may be configured to support a higher data rate. For example, a forward or reverse supplemental channel may be configured to support a data rate of up to 307.2 kpbs.

In order to achieve a particular data rate in a fundamental or supplemental channel, the signal is transmitted in accordance with predefined characteristics, including a particular type of modulation and a particular type of forward error correction (FEC) coding. The predefined characteristics that may be used to achieve different data rates are described in $3^{rd}$ Generation Partnership Project 2, "Physical Layer Standard for cdma2000 Spread Spectrum Systems, Revision E," 3GPP2 C.S0002-E, Version 1.0, September 2009, which is incorporated herein by reference.

OVERVIEW

In a first principal aspect, an exemplary embodiment provides a method in which a transmitting node transmits digital data with a first level of repetition over a first air interface to a receiving node during an initial part of a communication session, a degradation in quality of the communication session is detected, and, in response to the degradation in quality, the transmitting node transmits digital data with a second level of repetition over a second air interface channel to the receiving node during a subsequent part of the communication session. The second level of repetition is higher than the first level of repetition. In one example, the transmitting node is a base station and the receiving node is a mobile station, wherein the digital data is forward-link data for the communication session. In another example, the transmitting node is a mobile station and the receiving node is a base station, wherein the digital data is reverse-link data for the communication session.

In a second principal aspect, an exemplary embodiment provides a method for a radio access network (RAN). The RAN uses a first forward-link channel and a first forward-link data rate to transmit forward-link data to a mobile station for an initial part of a communication session. A degradation in quality of the communication session is detected. In response to the degradation in quality, the RAN uses a second forward-link channel and a second forward-link data rate to transmit forward-link data to the mobile station for a subsequent part of the communication session. The second forward-link data rate is higher than the first forward-link data rate.

In a third principal aspect, an exemplary embodiment provides a system comprising a first channel element for transmitting wireless signals, a second channel element for transmitting wireless signals, and a controller for controlling the first and second channel elements. The controller is configured to (i) detect a degradation in quality of a communication session in which the first channel element transmits digital data over a first air interface channel using a first level of repetition, and (ii) in response to the degradation in quality, control the second channel element to transmit digital data for the communication session over a second air interface channel using a second level of repetition. The second level of repetition is higher than the first level of repetition. In one example, the first channel element, second channel element, and controller are in a RAN. In another example, the first channel element, second channel element, and controller are in a mobile station.

DETAILED DESCRIPTION OF EXEMPLARY EMBODIMENTS

1. Introduction

Figure 1:
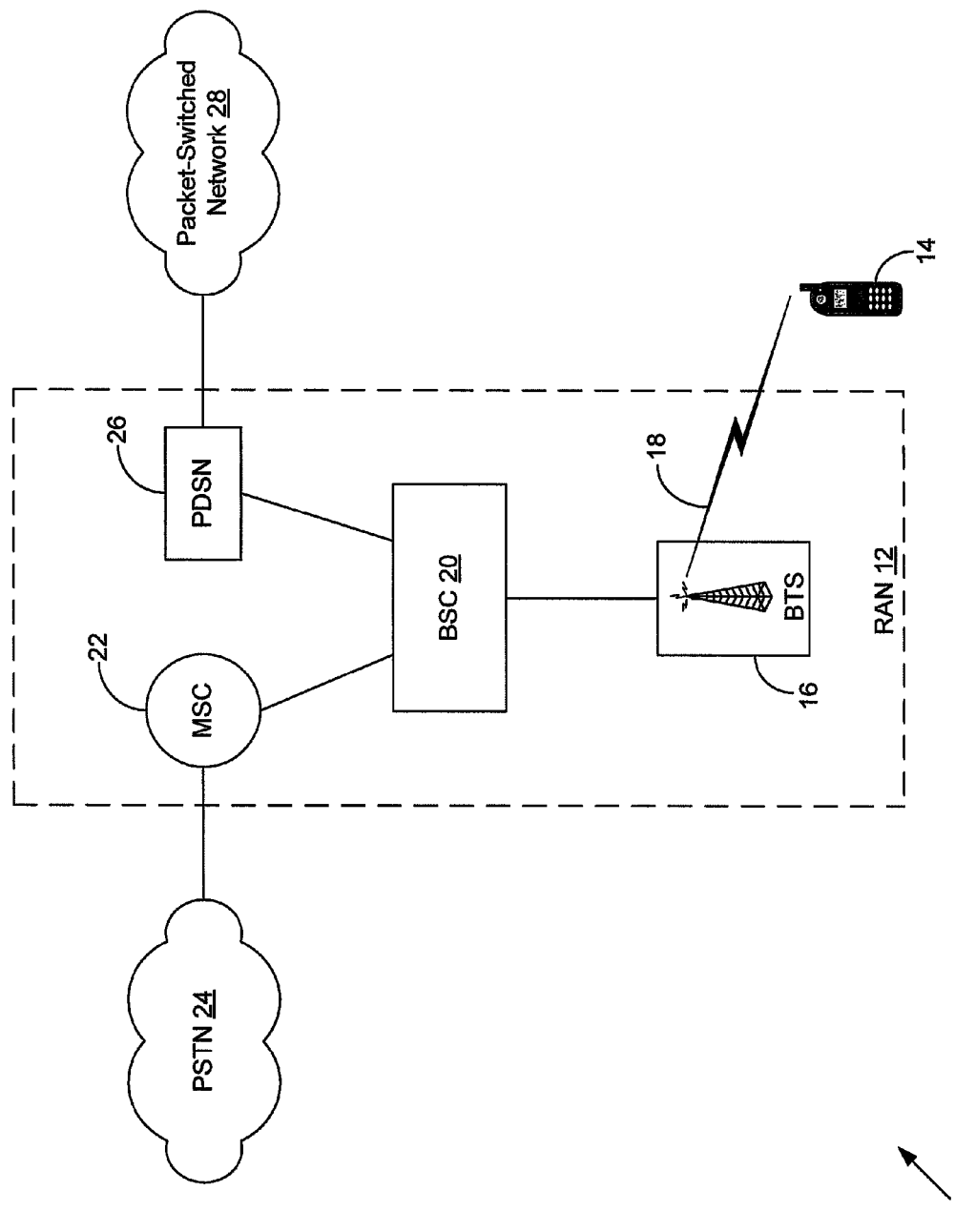
FIG. 1 is a block diagram of a wireless telecommunications network, in accordance with an exemplary embodiment.

The inventors have recognized that supplemental channels that support high data rates for wireless communications can also be used to improve the quality of communication sessions that involve the exchange of low data rate signals, such as voice signals. For example, a radio access network (RAN) and a mobile station engaged in a communication session, such as a voice call, may initially use a forward fundamental channel for the forward link and a reverse fundamental channel for the reverse link. However, when a degradation in quality of the communication session is detected, the communication session may be continued using a forward supplemental channel for the forward link and a reverse supplemental channel for the reverse link. The supplemental channels may support higher data rates than the fundamental channels. The higher data rates may, in turn, enable the RAN to transmit the forward-link data multiple times over the forward supplemental channel and may enable the mobile station to transmit the reverse-link data multiple times over the reverse supplemental channel. By transmitting the forward-link and reverse-link data multiple times, the chances of the forward-link data being successfully received by the mobile station and the reverse-link data being successfully received by the RAN may be improved.

Thus, supplemental channels may improve the quality of a communication session by enabling forward-link data and/or reverse-link data to be transmitted with a higher level of repetition than when fundamental channels are used. In addition, supplemental channels may not have the same limitations on transmit power levels as fundamental channels. Thus, a forward supplemental channel may be used to transmit forward-link data at a higher power level and a reverse supplemental channel may be used to transmit reverse-link data at a higher power level, thereby improving the chances that the forward-link data will be successfully received by the mobile station and the reverse-link data will be successfully received by the RAN.

After a degradation in quality of a communication session is detected and supplemental channels are selected, the supplemental channels could be used in combination with the original fundamental channels. For example, a RAN and a mobile station may initially use fundamental channels having a data rate of 9.6 kpbs to transmit voice frames exchanged during a voice call. After a degradation in quality is detected, the RAN may select forward and reverse supplemental channels having a much higher data rate, such as 307.2 kpbs. The voice call may then be continued with both the fundamental and supplemental channels being used to transmit the voice frames. For example, the RAN may transmit one voice frame over a forward fundamental channel during a transmission period and may transmit the voice frame multiple times over a forward supplemental channel during the same transmission period. Similarly, the mobile station may transmit a voice frame multiple times over a reverse supplemental channel for every time the mobile station transmits the voice frame over a reverse fundamental channel.

The level of repetition used for a supplemental channel, as compared to the corresponding fundamental channel, may depend on the supplemental channel's increased data rate relative to the fundamental channel. For example, the supplemental channel may have a data rate that is an integral multiple, M, of the data rate of the fundamental channel. In that case, the supplemental channel may use a level of repetition that is N times higher than that of the fundamental channel, where N is an integer that is greater than one and less than or equal to M. Thus, a voice frame (or other data portion) may be transmitted N times over the supplemental channel for every time the voice frame (or other data portion) is transmitted over the fundamental channel. For the specific example of a 9.6 kpbs fundamental channel and a 307.2 kbps supplemental channel, a voice frame may be transmitted over the supplemental channel up to 32 times for every time it is transmitted over the fundamental channel.

Although the above examples are described with respect to voice calls that involve the exchange of voice frames, it is to be understood that the approaches could also be used for other types of communication sessions that may involve the exchange of other types of data. In addition, it is to be understood that a 9.6 kpbs fundamental channel and a 307.2 kpbs supplemental channel are merely examples, as the fundamental channel and/or supplemental channel could have a higher or lower data rate. Further, the use of fundamental and supplemental channels are exemplary only, as other types of air interface channels could be used.

A degradation in quality for a communication session may be detected, for example, when an error rate (such as a frame error rate) exceeds an error threshold or a signal-to-noise ratio (SNR) falls below an SNR threshold for the forward link and/or reverse link. The degradation in quality may occur when a mobile station starts to move out of a base station's wireless coverage area, when a wireless signal path becomes obstructed, or when radio frequency (RF) conditions deteriorate for some other reason.

When a degradation in quality is detected for one communication link (i.e., either the forward link or the reverse link), a supplemental channel may be selected for that communication link only or supplemental channels may be selected for both communication links. Thus, the communication session could be continued using a fundamental channel for one communication link and a forward channel in combination with a supplemental channel for the other communication link. Alternatively, the communication session could be continued using a fundamental channel in combination with a supplemental channel for both communication links. In still other cases, a communication session may be continued using a supplemental channel in place of a fundamental channel for one or both communication links, instead of using a supplemental channel in combination with a fundamental channel.

It is to be understood that after a degradation in quality has been detected and a communication session has been continued using one or more supplemental channels, RF conditions may improve. In some cases, RF conditions may improve to the point that one or more of the supplemental channels may be de-allocated and the communication session continued further using only fundamental channels.

In this way, one or more communication links for a communication session may be reconfigured in response to changing RF conditions. When RF conditions are good, low data rate channels (e.g., fundamental channels) may be used to transmit forward-link data and reverse-link data for the communication session. When RF conditions are bad, high data rate channels (e.g., supplemental channels) may be used to transmit the forward-link and reverse-link data with a higher level of repetition, so as to improve the chances of the forward-link and reverse-link data being successfully received.

2. Exemplary Wireless Telecommunications Network

FIG. 1 is a block diagram of a wireless telecommunications network 10 in which exemplary embodiments may be employed. Wireless telecommunications network 10 includes a radio access network (RAN) 12 that can wirelessly communicate with mobile stations, such as mobile station 14. Mobile station 14 could be, for example, a wireless telephone, wireless personal digital assistant, wirelessly-equipped computer, or other wireless communication device.

To support wireless communication with mobile stations, such as mobile station 14, RAN 12 may include one or more base transceiver stations (BTSs), exemplified in FIG. 1 by BTS 16. BTS 16 has a wireless coverage area (e.g., a cell or one or more sectors) within which BTS 16 can wirelessly communicate with mobile stations. For example, BTS 16 may communicate with mobile station 14 over an air interface 18, as shown in FIG. 1. The wireless communications between BTS 16 and mobile station 14 over air interface 18 may be in accordance with a protocol such as 1xRTT CDMA, EVDO, GSM, WiMAX (IEEE 802.16), WiFi (IEEE 802.11), UMTS, LTE, or other wireless communication protocol.

Although FIG. 1 shows RAN 12 with only one BTS, it is to be understood that RAN 12 may include a greater number. RAN 12 may also include one or more controllers, such as a base station controller (BSC) 20, which may control one or more BTSs, such as BTS 16.

RAN 12 may, in turn, be communicatively coupled to one or more other types of networks. For example, RAN 12 may include a mobile switching center (MSC) 22 that is communicatively coupled to a circuit-switched network, such as PSTN 24, and to BSC 20. Alternatively or additionally, RAN 12 may include a packet data serving node (PDSN) 26 that is communicatively coupled to a packet-switched network 28, such as the Internet, and to BSC 20. It is to be understood, however, that the configuration of RAN 12 shown in FIG. 1 is exemplary only, as RAN 12 could be communicatively coupled to other types of networks and/or could be configured in other ways.

With the configuration of RAN 12 shown in FIG. 1, mobile station 14 may be able to engage in a voice call with one or more endpoints via PSTN 24. Such endpoints could be for example, landline stations or other mobile stations. Mobile station 14 may also be able to engage in a data call with one or more endpoints via packet-switched network 28. Such data calls may involve the exchange of voice (e.g., VoIP communications), data, video, and/or other media, with endpoints such as VoIP devices, e-mail servers, Web servers, gaming servers, instant messaging servers, or streaming media servers.

Figure 2:
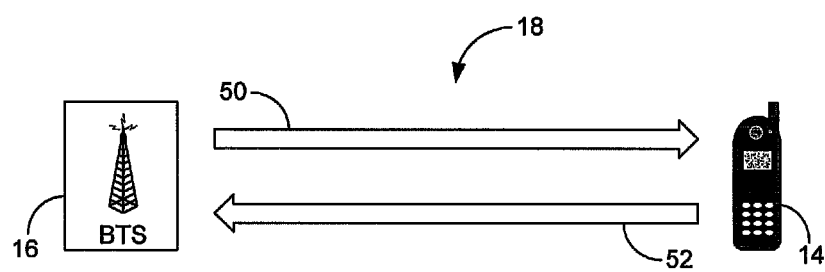
FIG. 2 is a schematic diagram of an air interface configuration that uses a fundamental channel for the forward link and a fundamental channel for the reverse link, in accordance with an exemplary embodiment.

The communications over air interface 18 may include forward link signals transmitted by BTS 16 over one or more forward link channels. The communications over air interface 18 may also include reverse link signals transmitted over one or more reverse link channels. For example, air interface 18 could be configured for a communication session involving mobile station 14 and BTS 16 as illustrated in FIG. 2. In the example of FIG. 2, BTS 16 transmits forward-link data for the communication session over a forward fundamental channel 50, and mobile station 14 transmits reverse-link data for the communication session over a reverse fundamental channel 52.

Figure 3:
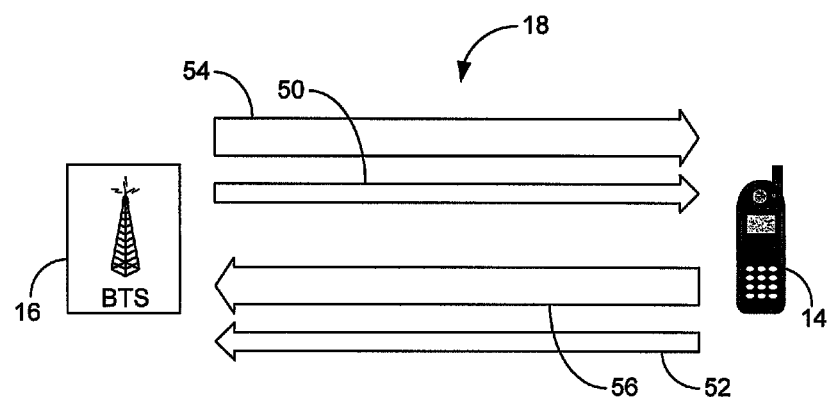
FIG. 3 is a schematic diagram of an air interface configuration that uses a fundamental channel in combination with a supplemental channel for the forward link and a fundamental channel in combination with a supplemental channel for the reverse link, in accordance with an exemplary embodiment.

Air interface 18 could also be configured for a communication session as illustrated in FIG. 3. In the example of FIG. 3, the forward link uses forward fundamental channel 50 in combination with a forward supplemental channel 54, and the reverse link uses reverse fundamental channel 52 in combination with a reverse supplemental channel 56. Forward supplemental channel 54 supports a higher data rate than forward fundamental channel 50, and reverse supplemental channel 56 supports a higher data rate than reverse fundamental channel 52. Thus, BTS 16 may transmit forward-link data for the communication session over forward fundamental channel 50 while also transmitting the forward-link data multiple times over forward supplemental channel 54. Similarly, mobile station 14 may transmit reverse-link data for the communication session over reverse fundamental channel 52 while also transmitting the reverse-link data multiple times over reverse supplemental channel 56. As described in more detail below, air interface 18 may change configuration (from the FIG. 2 configuration to the FIG. 3 configuration, or vice versa) based on changing RF conditions.

In an exemplary embodiment, air interface 18 shown in FIGS. 2 and 3 is a 1xRTT air interface. Thus, forward fundamental channel 50 and forward supplemental channel 54 may share one 1.25 MHz frequency channel, and reverse fundamental channel 52 and reverse supplemental channel 56 may share a different 1.25 MHz frequency channel.

Alternatively, air interface 18 could be configured such that forward supplemental channel 54 is in a different frequency band than forward fundamental channel 50 and/or reverse supplemental channel 56 is in a different frequency band than reverse fundamental channel 52. In addition, the supplemental channels and fundamental channels could have different frequency bandwidths. For example, fundamental channels 50 and 52 could have a frequency bandwidth of 1.25 MHz and supplemental channels 54 and 56 could have wider frequency bandwidths.

In addition to the configurations shown in FIGS. 2 and 3, it is to be understood that other configurations of air interface 18 are possible. For example, air interface 18 could be configured to use a fundamental channel for the forward link and a fundamental channel in combination with a supplemental channel for the reverse link, or air interface 18 could be configured to use a fundamental channel in combination with a supplemental channel for the forward link and a fundamental channel for the reverse link. Further, while FIG. 3 shows each communication link using two air interface channels (a fundamental channel and a supplemental channel), air interface 18 could also be configured so that one or more of the communication links uses more than two air interface channels (e.g., a fundamental channel in combination with two supplemental channels).

3. Exemplary BTS

Figure 4:
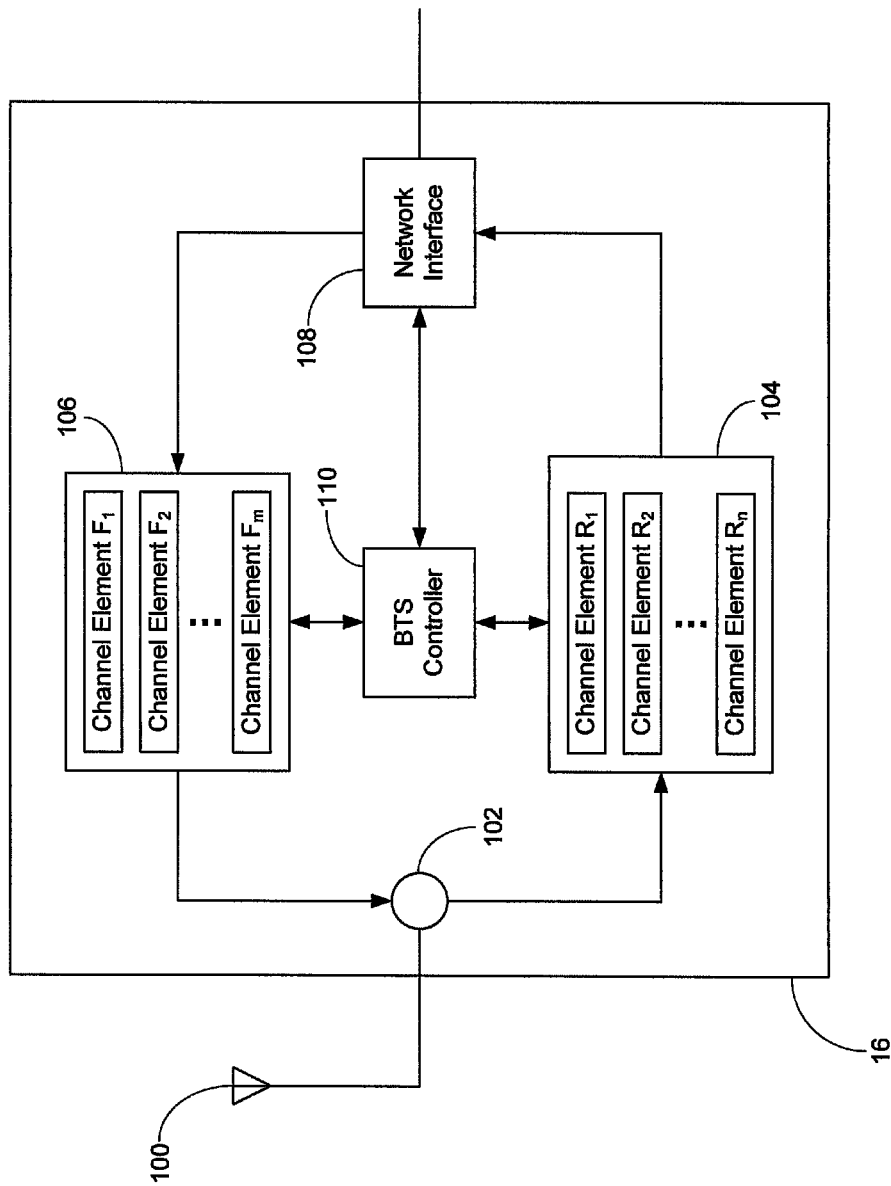
FIG. 4 is a block diagram of a base transceiver station (BTS), in accordance with an exemplary embodiment.

FIG. 4 illustrates an exemplary configuration for BTS 16. BTS 16 includes an antenna system 100 communicatively coupled to an RF distribution system 102. Antenna system 100 may include one or more antennas for wirelessly transmitting RF signals over one or more forward link channels and one or more antennas for wirelessly receiving RF signals over one or more reverse link channels. In an exemplary embodiment, antenna system 100 includes a plurality of directional antennas that define a plurality of sectors. For each sector, antenna system 100 may include, for example, at least one antenna for wirelessly transmitting RF signals and at least one antenna for wirelessly receiving signals.

RF distribution system 102 may distribute RF signals from antenna system 100 to a reverse link block 104 and RF signals from a forward link block 106 to antenna system 100. RF distribution system 102 may include, for example, coaxial cables, optical fibers, splitters, combiners, switches, and/or amplifiers, depending on the location and configuration of BTS 16.

BTS 16 may include a network interface 108 for interfacing BTS 16 with one or more network elements in RAN 12. For example, network interface 108 may interface BTS 16 with BSC 20. Network interface 108 may also be communicatively coupled to forward link block 106 and reverse link block 104. For example, network interface 108 may receive reverse-link signals from reverse link block 104 and transmit them to BSC 20. Further, network interface 108 may receive forward-link signals from BSC 20 and direct them to forward-link block 106 for transmission by antenna system 100.

Forward link block 106 may include a plurality of forward-link channel elements, shown in FIG. 4 as channel elements $F_1$ through $F_m$. Each forward-link channel element may be associated with a particular forward-link channel used by BTS 16. Thus, each of channel elements $F_1$ through $F_m$ may include hardware and/or software components that are configured to receive a network-level signal from network interface 108 and perform encoding, modulation, and/or other operations to convert the network-level signal into an RF signal that BTS 16 can transmit over a particular forward link channel. In the example illustrated in FIG. 4, forward link block 106 includes m forward-link channel elements. These m forward-link channel elements could all be associated with the same sector, or they could be used for multiple sectors. Further, different forward-link channel elements could be associated with different types of forward link channels, such as forward fundamental channels and forward supplemental channels.

Reverse link block 104 may include a plurality of reverse-link channel elements, shown in FIG. 4 as channel elements R₁ through R_n. Each reverse-link channel element may be associated with a particular reverse-link channel used by BTS 16. Thus, each of channel elements R₁ through R_n may include hardware and/or software components that are configured to receive an RF signal corresponding to a particular reverse link channel and perform demodulation, decoding, and/or other operations to convert the RF signal into a network-level signal that network interface can transmit to BSC 20. In the example illustrated in FIG. 4, reverse link block 104 includes n reverse-link channel elements. These n reverse-link channel elements could all be associated with the same sector, or they could be used for multiple sectors. Further, different reverse-link channel elements could be associated with different types of reverse link channels, such as reverse fundamental channels and reverse supplemental channels.

BTS 16 may also include a BTS controller 110 that controls the usage and configuration of forward-link channel elements F₁ through F_m in forward link block 106 and reverse-link channel elements R₁ through R_n in reverse link block 104. For example, BTS controller 110 may allocate for a given communication session a forward-link channel element in forward link block 106 (e.g., channel element F₁) for a forward fundamental channel and a reverse-link channel element in reverse link block 104 (e.g., channel element R₁) for a reverse fundamental channel. In response to a degradation in quality of the communication session, BTS controller 110 may allocate one or more additional channel elements for the communication session. For example, BTS controller 110 may allocate an additional forward-link channel element (e.g., channel element F₂) for a forward supplemental channel and an additional reverse-link channel element (e.g., channel element R₂) for a reverse supplemental channel.

BTS controller 110 may control forward link block 106 and/or reverse link block 104 either autonomously or in response to instructions from one or more other network elements, such as from BSC 20. For example, BTS controller 110 may obtain information regarding the quality of network-level signals provided by reverse-link channel elements in reverse link block 104 and/or information regarding signal qualities transmitted by forward-link channel elements in forward link block 106 and received by mobile stations, provide the information to BSC 20 via network interface 108, receive responsive instructions from BSC 20 via network interface 108, and control forward link block 106 and/or reverse link block 104 in accordance with the instructions.

In this way, a controller, such as BTS controller 110, may detect a signal quality degradation in a communication session involving BTS 16 and mobile station 14 in which a forward fundamental channel is used for the forward link and a reverse fundamental channel is used for the reverse link. In response to the detected signal quality degradation, BTS controller 110 may control BTS 16 to (i) select a forward supplemental channel and a reverse supplemental channel, (ii) communicate the new channel information to mobile station 14, and (iii) continue the communication session using the forward fundamental channel in combination with the forward supplemental channel for the forward-link data and the forward reverse channel in combination with the reverse supplemental channel for the reverse-link data, such that data is transmitted over each supplemental channel with a higher level of repetition than the corresponding fundamental channel.

4. Exemplary Method

Figure 5:
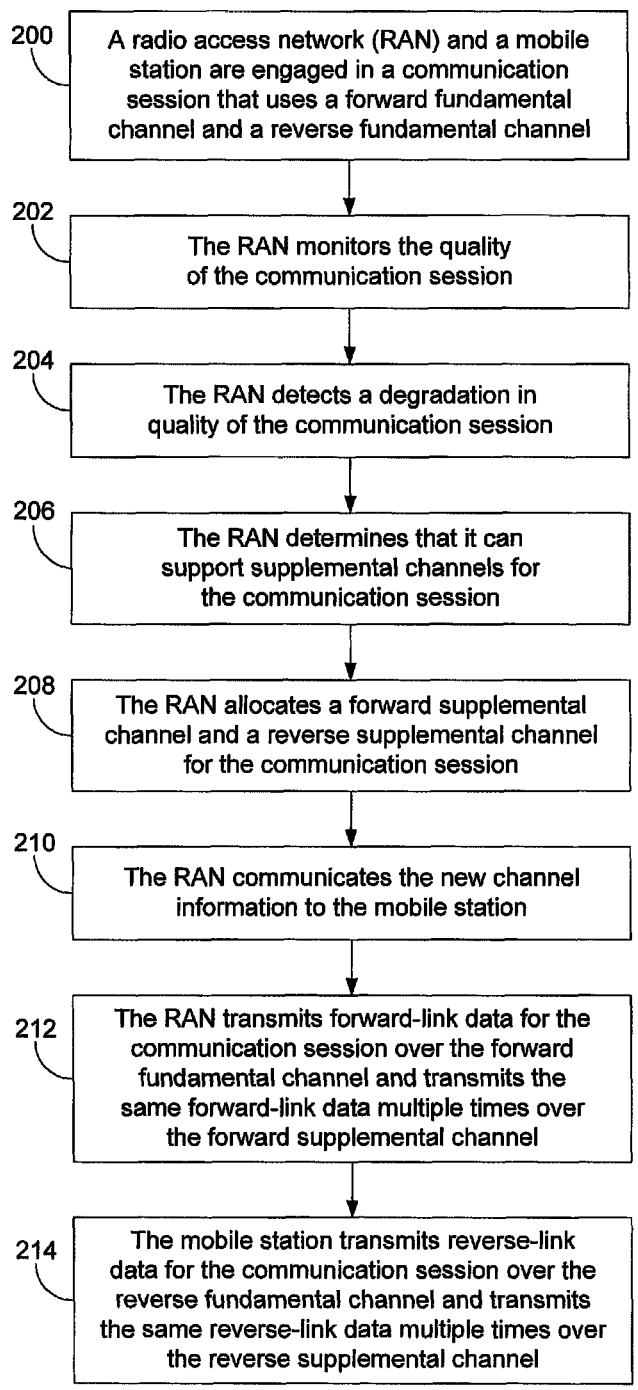
FIG. 5 is a flow chart illustrating a method for using supplemental channels for a communication session, in accordance with an exemplary embodiment.

FIG. 5 is a flow chart illustrating an exemplary method for using supplemental channels for a communication session. For purposes of illustration, FIG. 5 is described with reference to the configurations of wireless telecommunications network 10 shown in FIG. 1, the configurations of air interface 18 shown in FIGS. 2 and 3, and the configuration of BTS 16 shown in FIG. 4. It is to be understood, however, that other configurations could be used.

The method begins when a RAN (e.g., RAN 12) and a mobile station (e.g., mobile station 14) are engaged in a communication session that uses a forward fundamental channel for the forward link and a reverse fundamental channel for the reverse link, as indicated by block 200. Thus, the communication session may use the configuration of air interface 18 shown in FIG. 2, with BTS 16 in RAN 12 transmitting forward-link data over forward fundamental channel 50 and mobile station 14 transmitting reverse-link data over reverse fundamental channel 52.

The communication session could be, for example, a voice call or a data call. In the case of a voice call, BTS 16 may transmit voice frames over forward fundamental channel 50 at a data rate of 9600 bps and mobile station 14 may transmit voice frames over reverse fundamental channel 52 at a data rate of 9600 bps. Each voice frame may contain digitally encoded voice data, for example, voice data encoded by a vocoder such as the Enhanced Variable Rate Vocoder (EVRC).

During the communication session, the RAN monitors the quality of the communication session, as indicated by block 202. The RAN could monitor the quality by monitoring an error rate, such as a frame error rate or bit error rate, in the forward-link and/or reverse-link data that is received for the communication session. For example, BSC 20 in RAN 12 may monitor the frame error rate of the reverse-link data received by BTS 16, and mobile station 14 may monitor the frame error rate of the forward-link data that it receives and report the frame error rate to RAN 12.

Alternatively or additionally, the RAN could monitor quality by monitoring a signal-to-noise ratio of the reverse link signal. As one example, the signal-to-noise ratio could be an $E_b/N_0$ measurement of the reverse link signal after it has been de-spread, where $E_b$ is the bit energy and $N_0$ is the noise. As another example, the signal-to-noise ratio could be an $E_c/I_0$ measurement of the reverse pilot signal transmitted by the mobile station, where $E_c$ is the chip energy and $I_0$ is the total RF energy in the frequency band. The mobile station may make similar measurements of the signal-to-noise ratio of the forward link signal and report the measurements to the RAN. In addition to error rates and signal-to-noise ratios, other quality metrics could also be monitored by the RAN.

At some point, the RAN detects a degradation in quality of the communication session, as indicated by block 204. To determine whether the quality of the communication session has degraded, the RAN may compare one or more quality metrics to one or more threshold values.

In one example, the RAN monitors the frame error rate in the reverse-link data transmitted by the mobile station for the communication session and periodically compares the reverse-link frame error rate, $E_R$, to a reverse-link threshold value, $T_R$. If $E_R$ is greater $T_R$, then the RAN may consider the quality of the communication session to be degraded. The RAN may use a similar approach for the forward link. Thus, the RAN may receive a forward-link error rate, $E_F$, reported by the mobile station and may compare $E_F$ to a forward-link threshold value, $T_F$. If $E_F$ is greater $T_F$, then the RAN may consider the quality of the communication session to be degraded.

The RAN may use other types of thresholds for other types of quality metrics. For example, if the RAN monitors a signalto-noise ratio, S, for either the forward link or the reverse link, the RAN may compare S to a threshold value $T_S$. If S is less than $T_S$, then the RAN may consider the quality of the communication session to be degraded.

In addition to error rates and signal-to-noise ratios, the RAN may consider other quality metrics or combinations of quality metrics to detect a degradation in quality of the communication session. As one example, if the transmit power level for either the forward link or reverse link has remained at its maximum level for a certain period of time, the RAN may consider the quality of the communication session to be degraded. As another example, the RAN may consider detect a degradation in quality when a call-drop timer for the communication session has nearly expired. Thus, the RAN may use supplemental channels to continue a communication session as a last resort, after other methods have been unsuccessful.

After the RAN has detected a degradation in quality, the RAN may determine whether it can support supplemental channels for the communication session, as indicated by block 206. To make this determination, the RAN may determine whether sufficient channel elements, Walsh codes, transmission power, and/or other resources are available to support the use of a forward supplemental channel and a reverse supplemental channel for the communication session. The RAN may also consider the current traffic levels, for example, based on the number of users, the number of communication sessions, the amount of data being buffered, etc. In addition, the RAN may consider the current interference level in the mobile station's sector, for example, based on a reverse noise rise (RNR) level.

For purposes of illustration, the example of FIG. 5 assumes that the RAN has determined that it can support supplemental channels for the communication session. Thus, the RAN proceeds to allocate a forward supplemental channel and a reverse supplemental channel, as indicated by block 208. As part of the process of allocating the supplemental channels, the RAN may select the data rates and repetition rates to be used for the supplemental channels. For example, the RAN may select the data rate of the forward and/or reverse supplemental channel to be a multiple, M, of the data rate of the corresponding fundamental channel. The RAN may then select the repetition rate, N, based on the value of M. As noted above, N may be limited by M, such that $1<N\leq M$. The forward and reverse supplemental channels could use the same repetition rate or they could use different repetition rates. Thus, the RAN may select one repetition rate ($N_F$) for the forward supplemental channel and a different repetition rate ($N_R$) for the reverse supplemental channel.

The RAN communicates the new channel information to the mobile station, as indicated by block 210. The new channel information may identify the forward supplemental channel and reverse supplemental channel, for example, by identifying their corresponding Walsh codes. The new channel information may also specify the data rates and repetition rates selected for the supplemental channels.

At this point, the RAN and mobile station may begin using the supplemental channels for the communication session. Thus, the RAN may transmit forward-link data for the communication session over the forward fundamental channel and transmit the same forward-link data multiple times over the forward supplemental channel, as indicated by block 212. Similarly, the RAN may transmit reverse-link data for the communication session over the reverse fundamental channel and transmit the same reverse-link data multiple times over the reverse supplemental channel, as indicated by block 214.

The repetition rate that the RAN selected for a given supplemental channel may define the number of times that the forward-link or reverse-link data is transmitted over that supplemental channel. For example, the RAN may transmit forward-link data $N_F$ times over the forward supplemental channel for every one time that the RAN transmits the data over the forward fundamental channel. Similarly, the mobile station may transmit reverse-link data $N_R$ times over the reverse supplemental channel for every one time that the mobile station transmits the data over the reverse fundamental channel.

The transmissions over a fundamental channel and its corresponding supplemental channel may occur substantially concurrently. For example, during a given transmission period, the RAN may transmit a data portion (e.g., a voice frame) once over the forward fundamental channel. During that given transmission period, the RAN may transmit the same data portion $N_F$ times over the forward supplemental channel. It is to be understood, however, that while the RAN may use the entire transmission period to transmit the data portion over the forward fundamental channel, the RAN may use less than the entire transmission period to transmit the data portion $N_F$ times over the forward supplemental channel. For example, the RAN may transmit the data portion $N_F$ times over the forward supplemental channel as a sequence of bursts.

In this way, the RAN and mobile station may continue the communication session using an air interface that is configured as shown in FIG. 3. At some point, the RAN may determine that RF conditions have improved sufficiently that the RAN may re-configure the air interface for the communication to use an air interface that is configured as shown in FIG. 2. In this way, the RAN may adjust the air interface used for a communication session involving the RAN and a mobile station to adapt to changing RF conditions.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
   a transmitting node transmitting digital data with a first level of repetition over a first air interface channel to a receiving node during an initial part of a communication session;
   detecting a degradation in quality of said communication session; and
   in response to said degradation in quality, said transmitting node transmitting digital data with a second level of repetition over a second air interface channel to said receiving node during a subsequent part of said communication session and said transmitting node transmitting digital data with said first level of repetition over said first air interface channel to said receiving node during said subsequent part of said communication session, wherein said second level of repetition is N times higher than said first level of repetition and N is an integer greater than one, such that a data portion transmitted over said first air interface channel during said subsequent part of said communication session is transmitted N times over said second air interface channel during said subsequent part of said communication session.

2. The method of claim 1, wherein said transmitting node is a base station and said receiving node is a mobile station.

3. The method of claim 1, wherein said transmitting node is a mobile station and said receiving node is a base station.

4. The method of claim 1, wherein said communication session is a voice call and said digital data comprises a plurality of voice frames, wherein each voice frame contains digitally encoded voice data.

5. The method of claim 4, wherein said first air interface channel is a fundamental channel and said second air interface channel is a supplemental channel.

6. The method of claim 4, wherein said transmitting node transmitting digital data with said first level of repetition over said first air interface channel to said receiving node during said subsequent part of said communication session comprises:
said transmitting node transmitting a voice frame over said first air interface channel during a transmission period.

7. The method of claim 6, wherein said transmitting node transmitting digital data with a second level of repetition over a second air interface channel to said receiving node during a subsequent part of said communication session comprises:
said transmitting node transmitting said voice frame over said second air interface channel a total of N times during said transmission period.

8. The method of claim 1, wherein detecting a degradation in quality of said communication session comprises:
determining an error rate in digital data received by said receiving node over said first air interface channel during said initial part of said communication session; and
determining that said error rate is greater than a threshold.

9. The method of claim 1, wherein detecting a degradation in quality of said communication session comprises:
determining a signal-to-noise ratio measured by said receiving node for said first air interface channel during said initial part of said communication session; and
determining that said signal-to-noise ratio is less than a threshold.

10. A base station, comprising:
a first forward-link channel element for transmitting wireless signals;
a second forward-link channel element for transmitting wireless signals; and
a controller, wherein said controller is configured to (i) detect a degradation in quality of a communication session in which said first forward-link channel element transmits digital data for said communication session over a first forward channel using a first level of repetition, and (ii) in response to said degradation in quality, continue said communication session using both said first forward-link channel element to transmit digital data for said communication session over said first forward channel using said first level of repetition and said second forward-link channel element to transmit digital data for said communication session over a second forward channel using a second level of repetition, wherein said second level of repetition is N times higher than said first level of repetition and N is an integer greater than one, such that a data portion transmitted over said first forward channel is transmitted N times over said second forward channel.

11. The base station of claim 10, wherein said first forward channel is a forward fundamental channel and said second forward channel is a forward supplemental channel.

12. The base station of claim 10, further comprising:
a first reverse-link channel element for receiving wireless signals; and
a second reverse-link channel element for receiving wireless signals.

13. The base station of claim 12, wherein said degradation in quality is in said communication session in which said first forward-link channel element transmits digital data for said communication session over said first forward channel and said first reverse-link channel element receives digital data for said communication session over a first reverse channel.

14. The base station of claim 13, wherein said controller is configured to in response to said degradation in quality, continue said communication session using both said first reverse-link channel element to receive digital data for said communication session over said first reverse channel and said second reverse-link channel element to receive digital data for said communication session over a second reverse channel, wherein said base station receives digital data over said second reverse channel with a higher level of repetition than said first reverse channel.

15. The base station of claim 14, wherein said first reverse channel is a reverse fundamental channel and said second reverse channel is a reverse supplemental channel.

16. The base station of claim 14, wherein said controller is configured to select said second forward channel and said second reverse channel in response to said degradation in quality.

* * * * *